US008799295B2

(12) United States Patent
Fisken (10) Patent No.: US 8,799,295 B2
(45) Date of Patent: Aug. 5, 2014

(54) METHOD AND SYSTEM FOR SCORING DOMAIN NAMES

(75) Inventor: Alex Fisken, Fairfax, VA (US)

(73) Assignee: Network Solutions Inc., Herndon, VA (US)

( * ) Notice: Subject to any disclaimer, the term of this patent is extended or adjusted under 35 U.S.C. 154(b) by 942 days.

(21) Appl. No.: 12/417,949

(22) Filed: Apr. 3, 2009

(65) Prior Publication Data

US 2009/0254545 A1    Oct. 8, 2009

Related U.S. Application Data

(60) Provisional application No. 61/042,642, filed on Apr. 4, 2008.

(51) Int. Cl.
*G06F 17/30* (2006.01)
*G06Q 30/02* (2012.01)

(52) U.S. Cl.
CPC ..................... *G06Q 30/02* (2013.01)
USPC ....................................................... 707/748

(58) Field of Classification Search
USPC ........................................................ 707/748
See application file for complete search history.

(56) References Cited

U.S. PATENT DOCUMENTS

| | | | | |
|---|---|---|---|---|
| 7,281,042 | B2 * | 10/2007 | Hsu et al. | 709/224 |
| 7,305,394 | B2 * | 12/2007 | Fellman | 1/1 |
| 7,627,628 | B2 * | 12/2009 | King et al. | 709/203 |
| 7,761,565 | B2 * | 7/2010 | Adelman et al. | 709/224 |
| 7,761,566 | B2 * | 7/2010 | Adelman et al. | 709/224 |
| 2006/0095459 | A1 * | 5/2006 | Adelman et al. | 707/102 |
| 2006/0200487 | A1 * | 9/2006 | Adelman et al. | 707/102 |
| 2008/0021890 | A1 * | 1/2008 | Adelman et al. | 707/3 |
| 2008/0022013 | A1 * | 1/2008 | Adelman et al. | 709/245 |
| 2008/0126344 | A1 * | 5/2008 | Hoffman et al. | 707/5 |
| 2009/0182898 | A1 * | 7/2009 | Adelman et al. | 709/245 |
| 2009/0216904 | A1 * | 8/2009 | Adelman et al. | 709/245 |
| 2009/0282027 | A1 * | 11/2009 | Subotin et al. | 707/5 |
| 2009/0282028 | A1 * | 11/2009 | Subotin et al. | 707/5 |
| 2009/0282038 | A1 * | 11/2009 | Subotin et al. | 707/6 |
| 2009/0299824 | A1 * | 12/2009 | Barnes, Jr. | 705/10 |
| 2010/0313266 | A1 * | 12/2010 | Feng et al. | 726/23 |
| 2010/0325250 | A1 * | 12/2010 | Colosi | 709/221 |
| 2011/0004504 | A1 * | 1/2011 | Ives et al. | 705/10 |
| 2011/0258237 | A1 * | 10/2011 | Thomas | 707/803 |
| 2014/0143331 | A1 * | 5/2014 | Smith et al. | 709/204 |

* cited by examiner

*Primary Examiner* — Ajay Bhatia
*Assistant Examiner* — Kurt Mueller
(74) *Attorney, Agent, or Firm* — Morris & Kamlay LLP (57) ABSTRACT

Methods and systems for scoring domain names are provided. A domain name may be scored based on a set of criteria, and a sub-score assigned to each criteria. The sub-scores may be used to generate a domain name score and identify ways of increasing the score of the domain name. A domain name score may provide an indication of the value or usefulness of the domain name.

19 Claims, 9 Drawing Sheets

FIG. 1

[Name of Product] header

[Name of Product] strengthens and extends your existing web presence. [Name of Product] is a domain name tool that helps you discover holes and weaknesses in your online presence.

Answer 3 simple questions to get your scorecard!

Use this domain name: | example.com |

[Name of Product] header

Analysis of skiing.com

Question 1 of 3 – Extension Index

Have you registered additional extensions of this exact domain name (e.g. .com, .net., .info)

○ I have registered this sort of alternative domain name.
   How many? | 1 ∨ |

◉ I have not registered this sort of alternative domain name.

[Name of Product] header

Analysis of skiing.com

Question 2 of 3 – Protecting Your Brand
Have you registered misspellings and common mistakes?
(e.g. someone might mistype skiing.com as skiign.com)?
What about names that sound like yours that competitors might register?

○ I have registered this sort of alternative domain name.
   How many? | 1 ∨ |

⦿ I have not registered this sort of alternative domain name.

[Name of Product] header

Analysis of skiing.com

Question 3 of 3 – Descriptive Domain Names
Have you registered descriptive domain names (e.g. You are a law firm specializing in a family law and only have registered smithjonesllp.com, so it would be a good idea to register nycustodylaw.com)?

How many? | 0 ∨ |

Please enter up to 3 keywords that describe the purpose of your site:
[        ] [        ] [        ]

(Note: You must enter at least one keyword)    [ Continue » ]

FIG. 5

[Name of Product] header

Proceed to the next screen to view results.

Results can be sent to you by email if you choose:

| email address |

Privacy Policy

View Results »

FIG. 6

[Name of Product] header

Other factors include:

+ Your domain name registration term
+ Whether your domain name is privately registered
+ Whether transfer lock is turned on for your domain name This information is part of the WHOIS database, and so is already available to us.

View Results »

[Name of Product]   🖨 Print this page

[ Email Results ] [ Forward This Quiz ] [ Check Another Site ]

Scorecard for skiing.com

| My Overall Domain Index | | ▰▰▰▱ |
|---|---|---|
| My Extension Index [short description] | | ▰▰▱▱ |
| My Brand Index [short description] | | ▰▰▰▱ |
| My Description Domains Index [short description] | | ▰▰▱▱ |
| My Registration Term Index [short description] | only for our customers | ▰▰▰▱ |
| My Privacy Index [short description] | | Unprotected [text is red] |
| My Security Index [short description] | | Protected |

Improve Your Score
Here are some ways to improve your score:          [ Add Selected Items To Cart ]

---

Improve Your Extension Index  ◉ ▰▰▱▱                                             X

You said you had registered the following additional extensions: None
Register additional extensions to increase your score!

| skiing | .com | .net | .mobi | .org | .us | .us.com | .info | .tv | .cc | .name | .biz | .co.uk | .eu | .de |
|---|---|---|---|---|---|---|---|---|---|---|---|---|---|---|
| | Taken | Taken | ▢ | Taken | Taken | ▢ | ▢ | ▢ | ▢ | ▢ | Taken | Taken | ▢ | ▢ |

---

Improve Your Brand Index  ◉ ▰▰▰▱                                               X

You said you had registered the following brand protection domain names: sking.com
Register any of those additional brand protection domain names to increase your score!

☐ skiign.com     ☐ skiingg.com     ☐ skkiing.com     ☐ ksiing.com

---

Improve Your Descriptive Domains Index  ◉ ▰▰▱▱                                  X

You said the purpose of your site was best summed up by the following keywords:

[ skiing ]     [ rockies ]     [ rentals ]     [ Update ]

Register any of these additional descriptive doman to increase your score:

☐ skiing-rockies-rental.com         ☐ skiinggrockiesrontalparty.com
☐ skiingrockiesleasing.com          ☐ skiing-rockies-leasing.com
☐ skiingrockiesrental.com           ☐ skiing-rockies-property.com
☐ skiingrockiesproperty.com

---

Improve Your Registration Term Index  ◉ ▰▰▰▱                                    X

Your registration term for skiing.com is currently set to expire on 3/10/2009.

Because search engines favor sites that are in it for the long haul, we encourage you to renew now and increase your registration term.

Add your domains to your cart to increase their registration terms

☐ skiing.com     ☐ skiing.net

---

Improve Your Privacy Index  ◉ Unprotected [test in red]                     X
Private Registration for skiing.com is currently off leaving your personal information unprotected.
Add Private Registration to those domain names:

☐ skiing.com     ☐ skiing.net

---

Improve Your Security Index  ◉ Protected                                    X
Transfer Lock for skiing.com is currently on. Your site is protected.

---

Web forwarding savings messaging
Buying in bulk savings messaging
[If non-Netsol customer] Free transfers message

[ Add Selected Items To Cart ]

FIG. 8

```
Header Title                                          [Print This Page]
          [Email Results] [Forward to a Friend] [Check Another Site]

[thumbnail] [Scorecard for [domain name]]

My Overall Domain Index                              | Bar graph

My Extension Index [short description]               | Bar graph
My Brand Index [short description]                   | Bar graph
My Descriptive Domains Index [short description]     | Bar graph
My Registration Term Index [short description]       | Bar graph
My Privacy Index [short description]                 | Condition
My Security Index [short description]                | Condition Improve Your Score                    [Add Selected Items to Cart]

Improve your extension index:                                 [x]

Search results

Improve your brand index:                                     [x]

Display up to 9 options preceded by checkboxes

Improve your brand index                                      [x]

Display up to 9 options preceded by checkboxes

Improve your registration term index:                         [x]

Show domain name(s) as an option to add to cart

Improve your privacy index:                                   [x]

Select domain names to add private reg.
  As new domain names are added above, add them as available in this list.

Improve your security index:                                  [x]

Select domain names to add transfer lock on path to cart.

[Add Selected Items to Cart]
```

METHOD AND SYSTEM FOR SCORING DOMAIN NAMES

CROSS-REFERENCES TO RELATED APPLICATIONS

This application claims priority to U.S. Provisional Application No. 61/042,642, filed Apr. 4, 2008, the disclosure of which is incorporated by reference in its entirety.

BACKGROUND OF THE INVENTION

The domain name system provides a hierarchical system to name resources available in a network, typically on the Internet. A domain name may be mapped to an Internet Protocol (IP) address, allowing for human-readable addresses to be associated with the resources to which an IP address is assigned. Domain names may be used as or associated with other identifiers, such as brand names, marketing materials, and individual or corporate names.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 7 shows an example domain score result that is calculated from information related to a domain.

DETAILED DESCRIPTION OF THE INVENTION

Domain names may be an important part of a marketing or branding program, and may be used to directly or indirectly create value for the business owning the domain name. Given the wide range of domain names that may be registered, it may be difficult to assess the value of a domain name without registering the domain and using it for a period of time. For example, it may be possible to evaluate the usefulness of a domain name relative to a particular purpose based on the amount of traffic received at a website hosted at the domain, after the domain has been registered. However, this may be an inefficient or undesirable way to judge the value of a domain name, since there can be significant costs associated with registering and maintaining the domain, creating and maintaining an associated website, attracting users to the website, and otherwise "testing" the domain.

Therefore, it may be desirable to evaluate the value or potential value of a domain name prior to registering it. To do so, a domain name evaluation or scoring machine is provided. As used herein, such an "evaluation machine" may refer to a service provided by a computerized system, which may perform one or more automated methods. For example, a service accessible over the Internet via one or more web pages may be provided by a computer program executing on a web server. The service may implement various methods to evaluate a domain name or web address and provide users with information that may enhance the users' web presence, protect their brand name, and otherwise provide an indication of the value of their domain names. The machine may obtain initial information by asking questions concerning a domain name that the user owns or is interested in registering. The machine can combine the customer-provided information with other information that can be obtained automatically, such as from public sources and from internal sources such as domain name registration records, customer accounts, and other information. If the user's domain name is registered an entity providing the evaluation tool, additional information regarding the user's domains or potential domains may be used. The machine may then generate a scorecard or other visual indication of various categories and values assigned to those categories by the method with respect to the provided domain name. The scorecard information can also provide suggestions on how to improve the score for the particular domain name.

For example, the user may be asked to enter the domain name to be scored. The domain name may be owned by the user, or it may be a domain the user is interested in registering or another domain for which the user wants to receive evaluation information. Upon receiving the domain name to be scored, a "whois" look-up may be performed to determine if the domain name is actually registered. The domain scoring tool may be provided by a domain registrar; if so, the whois query also may be used to determine whether the domain name registrant is a customer of the registrar for the domain name registration. Various other information also may be automatically retrieved, including (i) the term of the registration, (ii) whether or not private registration or other services or enhancements are associated with the domain name, and (iii) whether or not a "transfer lock" is on. "Private registration" may refer to one or more privacy-enhancing services, typically used to protect the identity of domain name registrants. One example of a private registration system is disclosed in U.S. Patent Application Pub. No. 2006/0168020, filed Dec. 10, 2004, the disclosure of which is incorporated by reference in its entirety. Other information about the domain name also may be retrieved from public sources. If the name is registered, the machine can retrieve other domains, if any, that have been registered to this same user, as well as publicly available facts such as whois records that are published and maintained by third parties. If the domain is not registered, the machine can return a result that notifies the user and asks if the user would like to register the domain name.

If the domain name is a registered domain name, the machine (after performing the steps above) can ask the user whether or not the user has registered any other top-level domains (TLDs) for the same domain name character string. The user can be given "yes" and "no" options, with various numerical choices under the "yes" category to indicate the number of other TLDs that are registered. For example, if the user requests an evaluation of example.org and has previously registered example.com, example.net, and example.us, the user would indicate that three other TLDs were registered.

The machine also may ask the user whether he/she has registered misspellings or similar spellings of the scored domain name. Continuing the previous example, the user might have registered exmple.com, x-ample.com, or similar domain names. The user can be given "yes" and "no" options, with various numerical choices under the "yes" category to indicate the number of misspellings that are registered.

The machine also may ask the user whether he/she has registered descriptive domain names that are related to the content associated with the web site to which the scored domain name is pointing. For example, if the domain to be scored is hockey-fan.com, the user may have previously registered icehockey.info, nhlscores.com, or similar domain names.

The machine also may ask the user to provide keywords that describe the purpose of the user's web site.

In some configurations, the machine may automatically or semi-automatically determine the information described above. For example, the machine may consult customer records or domain name registration records to determine whether the user has previously registered the same domain at other TLDs. Other information may be automatically retrieved by the machine.

Various delivery options may be offered to the user for the results of the scoring. For example, the results of the domain name scoring may be provided in a web page accessed by the user during the domain name evaluation process, provided via email to an address specified by the user, or any other suitable delivery mechanism. The machine can inform the user of additional scoring factors that may be considered, and that may be retrieved by the machine automatically).

The machine may produce an overall score and a score for each of the scored items. Additional scores may be included if the user is a customer of a registrar providing the domain scoring service. The individual scores may be based upon certain preset standards and how the submitted domain name compares to those preset standards. For example, a threshold level may be set for various score levels for each of the categories, and the domain score for each category determined by comparing the information related to the domain to the threshold levels. As a specific example, a scoring method may assign one point for each additional TLD registered by the user, so that a score of "3" would be assigned to a domain for which the user indicates that three other corresponding TLDs are registered. The results can be shown in printed and/or graphical form, such as a bar graph. Privacy (e.g., whether the domain name is subscribed to a private registration service) and security (e.g., a transfer lock) may be shown as a binary rating, i.e., as either on or off (protected or not). A thumbnail or other representation of a web page or other network resource to which the domain name points can also be shown. A blank image can be shown if there is no such web site or other resource to which the domain name points. Other graphical representations may be used to indicate the evaluation of the domain name.

The machine may automatically provide suggestions to the user for improving the score. For example, the machine may show a list of TLDs and indicate whether the domain name string is available in those TLDs, as well as offer to register the domain name in available TLDs based upon selections by the user. The machine also may suggest, offer to register, and/or register any number of alternative spellings of the scored domain name. The machine also may display descriptive domain names that can be registered by the user. If the machine is operated by a registrar, it may offer to effectuate improvements or changes to customer-only elements for a domain name registered with the registrar. For example, the user may elect to enroll an already-registered domain name in a private registration service. The suggested improvements may allow the user to take action to improve the score for the domain, such as where a private registration-protected domain name is given a higher score than an unprotected domain.

As previously described, the machine may use domain name information provided by the user in response to questions posed, and it may obtain additional domain name information automatically, such as through queries to a whois database. A "score" for the domain name as it relates to brand protection, ability to drive traffic to the associated web site, and other considerations may be calculated based on the information. Scoring for security and privacy elements may be included. The machine also may suggest ways to improve the scores and can provide the means for initiating the recommended steps.

Figure 1:
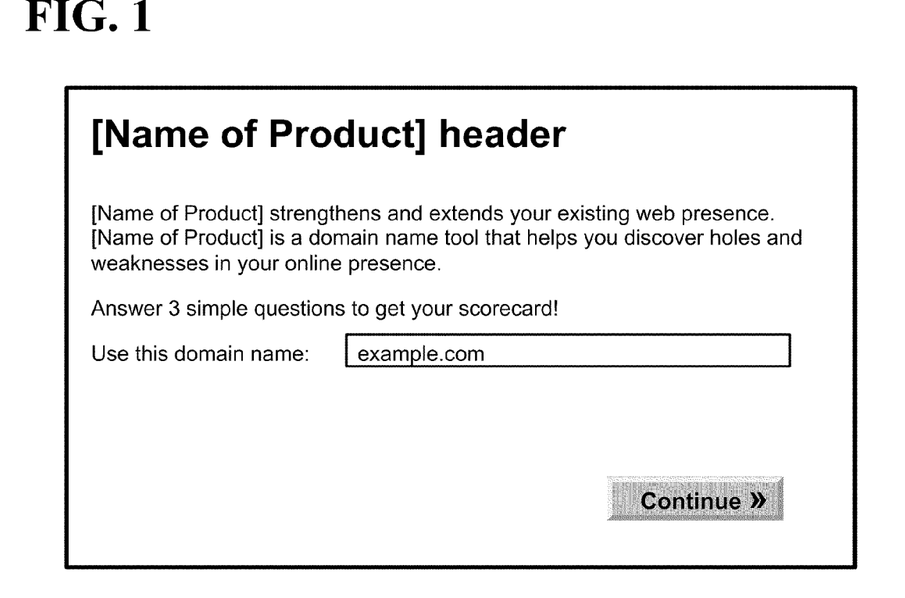
FIG. 1 shows an example user interface for requesting a domain name to be scored from a user.

FIG. 1 shows an example user interface for requesting a domain name to be scored from the user. In response to the user entering a domain name, whois data may be retrieved, including whether the domain has been registered and, if so, the registrar through which the domain was registered, the registration term, whether private registration is enabled, whether a transfer lock is active, and whether other related domain names are registered.

Figure 2:
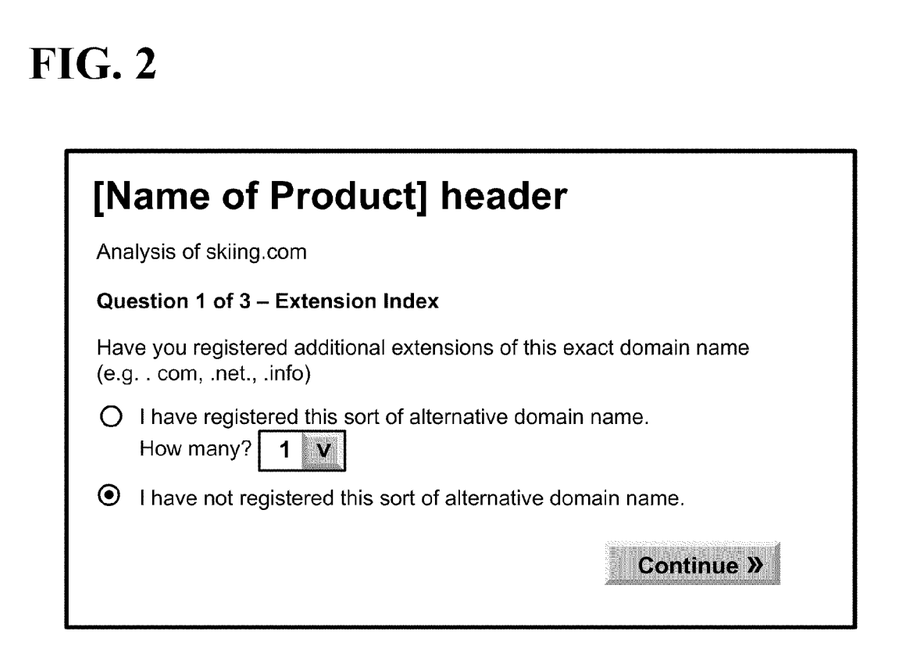
FIG. 2 shows an example user interface for requesting related domain registration information.

FIG. 2 shows an example user interface for requesting related domain registration information, such as whether the same domain has been registered in other TLDs. The number of other TLDs in which the domain is registered may be used to calculate a score for the domain.

Figure 3:
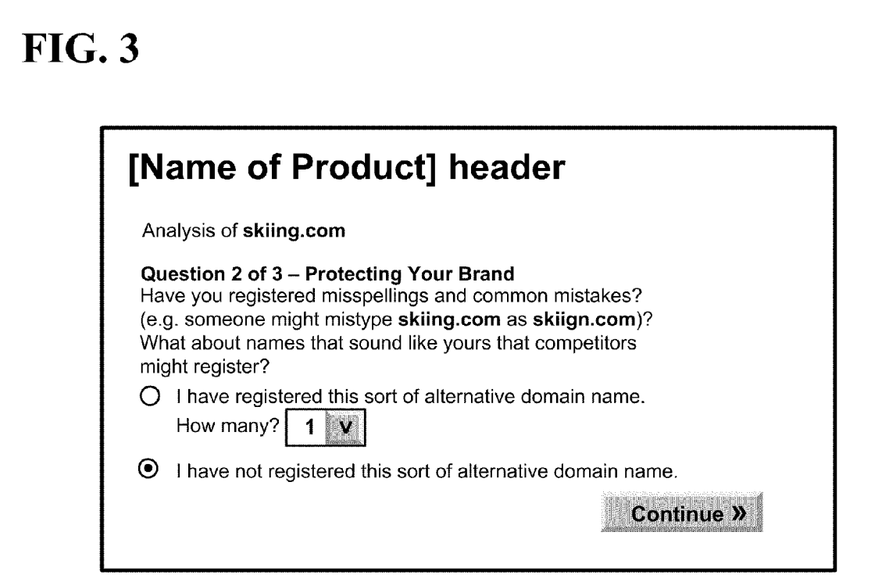
FIG. 3 shows an example user interface for requesting "brand protection" information.

FIG. 3 shows an example user interface for requesting "brand protection" information, such as misspellings, mistypings, and similar names that the user may have registered as alternative domain names.

Figure 4:
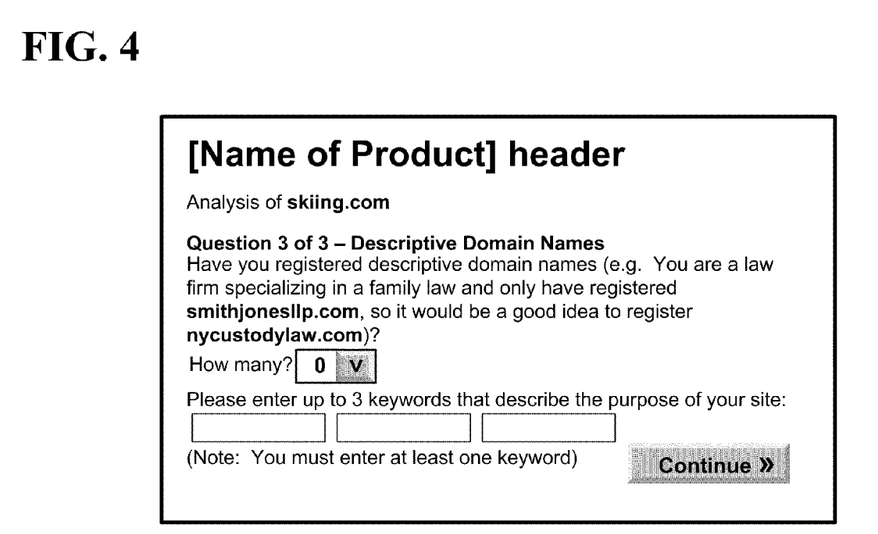
FIG. 4 shows an example user interface for requesting descriptive terms associated with a domain name to be scored.

FIG. 4 shows an example user interface for requesting descriptive terms associated with the domain name to be scored. These terms may be used, for example, to identify other domain names the user may wish to register.

Figure 5:
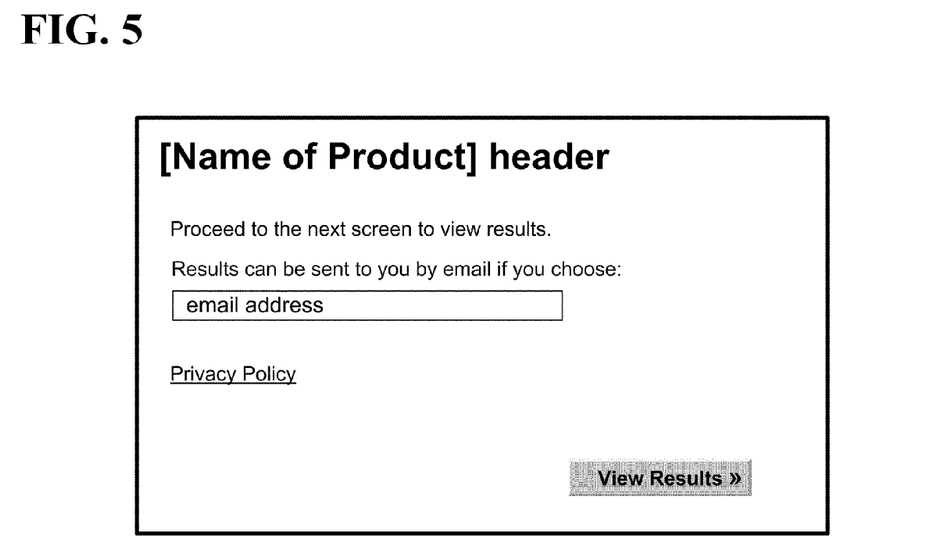
FIG. 5 shows an example user interface that offers an option for delivery of the domain score.

FIG. 5 shows an example user interface that offers an option for delivery of the domain score. In the example, the user is offered the option of receiving the domain score by email, and/or viewing the results. Other delivery mechanisms may be used.

Figure 6:
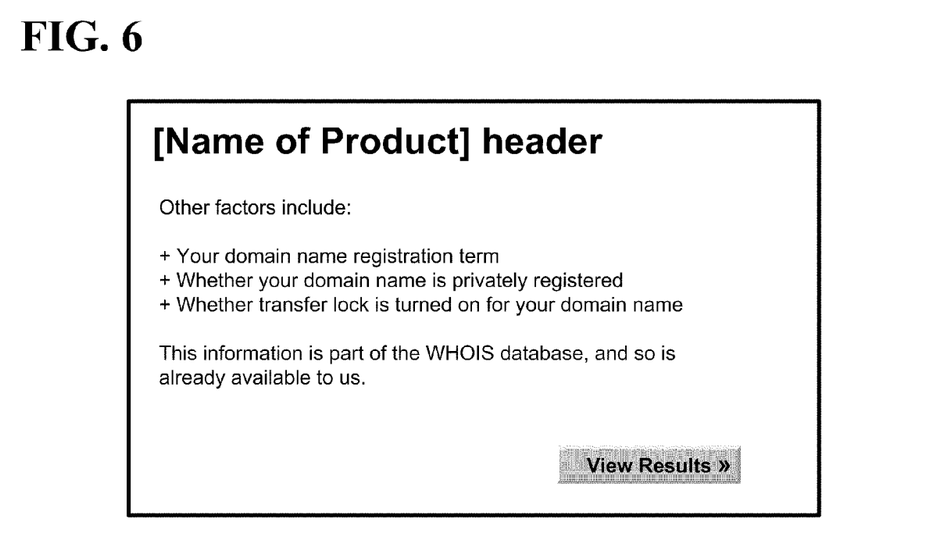
FIG. 6 shows a user interface for notifying the user that additional information is being gathered automatically.

FIG. 6 shows a user interface for notifying the user that additional information is being gathered automatically. For example, where the user is a customer of a registrar running the domain scoring application, customer account information and other options related to the domain may be collected.

FIG. 7 shows an example domain score result that is calculated from the gathered information related to a domain. Sub-scores may be provided as shown, such as the illustrated extension, brand, descriptive domains, registration term, privacy, and security indices. In some configurations certain scores may be provided only to customers of a registrar or other entity that offers the domain scoring machine. The results may include suggestions of how to improve the score, such as by registering additional TLDs or related domains. Example index results may include:

Overall Domain Index: The total index may be, for example, a mean of all the sub-scores.

Extension Index: Assigns a score based on the number of additional TLDs registered. For example, if four additional TLDs is set as the optimum number and the user has one domain registered, the score may start with a score of 25/100 and increase by 25 for each TLD they add. The score may be represented by the bar graph for each TLD checked in the Improve Score section below.

Brand Index: Similarly, if the ideal number of brand protection domain names is set at 3, the user may start with a score of 0 that increases by 33.33% with the addition of each of this type of domain name from the Improve Score section below.

Descriptive Domain Index: Similarly, if the ideal number of descriptive domain names is set at 3, the user starts with a score of 0 that increases by 33.33% with the addition of each of this type of domain name from the Improve Score section below.

Registration Term Index: Assigns a score based on the term for which the domain is registered. For example, if 10 years is set as the best term, a 1 year registration is assigned 10%, 2 years is 20%, 5 years is 50%, and 10 years is 100%.

Privacy Index: This index assigns a score based on whether a private registration service is associated with the domain. For example, the rating may be either "Protected" (private registration is being used with this domain name), or "Unprotected" (private reg. is not being used), or any other privacy designation. If the site is "Unprotected," a box may be displayed in the Improve Score section that can allow the user to activate or purchase a private registration service for the domain in question Security Index: Similarly, this index may be "Protected" (if a transfer lock is on for the domain), or "Unprotected" (transfer lock is off), or any other suitable designation. If the site is "Unprotected," a box may appear in the Improve Score section that allows the user to indicate their desire to turn on transfer lock for the domain in question.

The user may be presented with options for improving the score assigned to the domain. Examples may include extending the registration term, registering additional domain names or the same domain in additional TLDs, subscribing to a private registration service, and activating a transfer lock or other security services for the domain.

Figure 8:
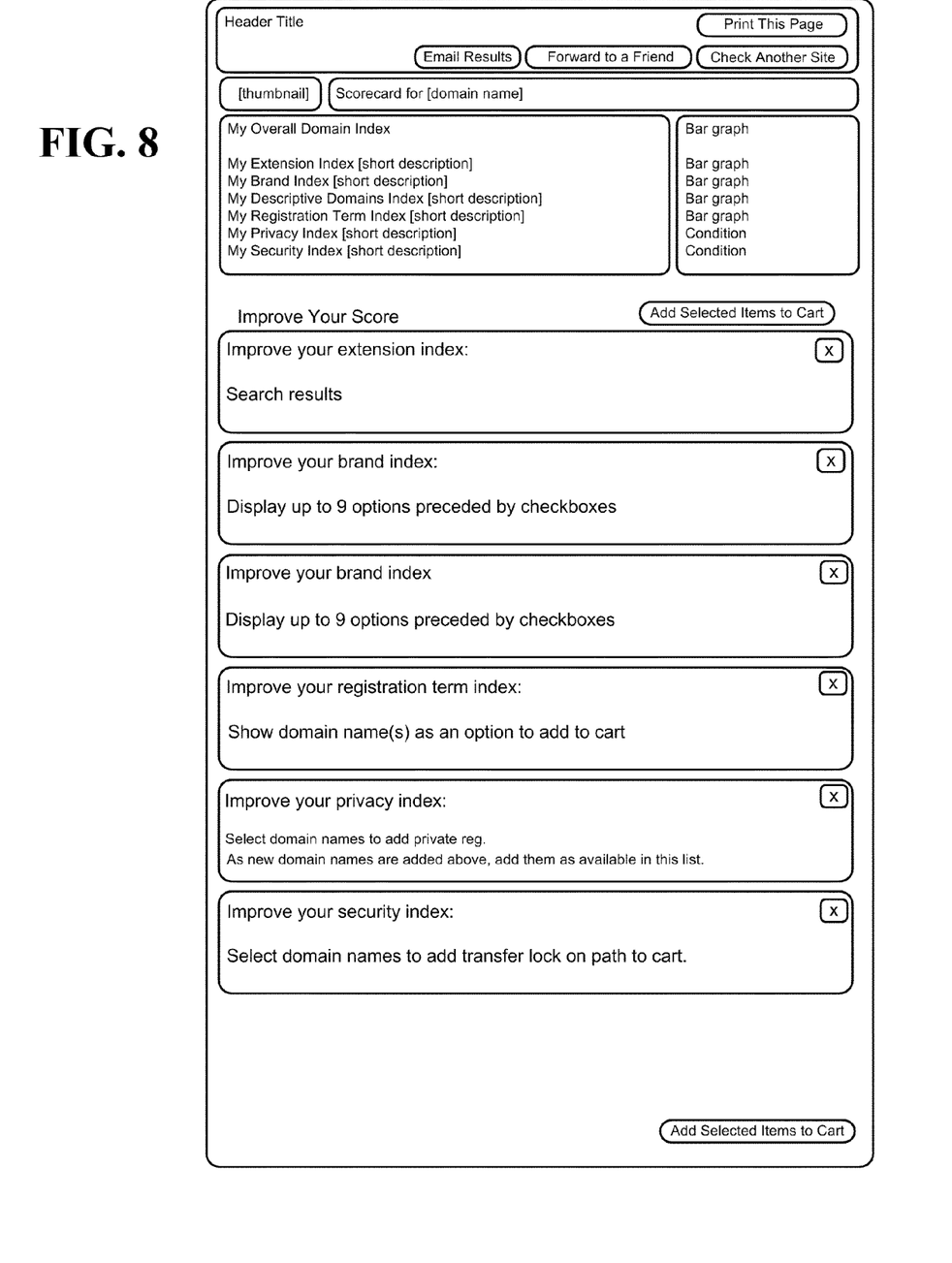
FIG. 8 shows an example user interface for presenting options to increase a domain score to a user.

In some cases, the user may be given the option to purchase options or services to improve the score of the domain. FIG. 8 shows an example user interface for presenting options to increase a domain score to a user. As illustrated, the options may be grouped according to the sub-score that each option will increase if purchased by the user.

Figure 9:
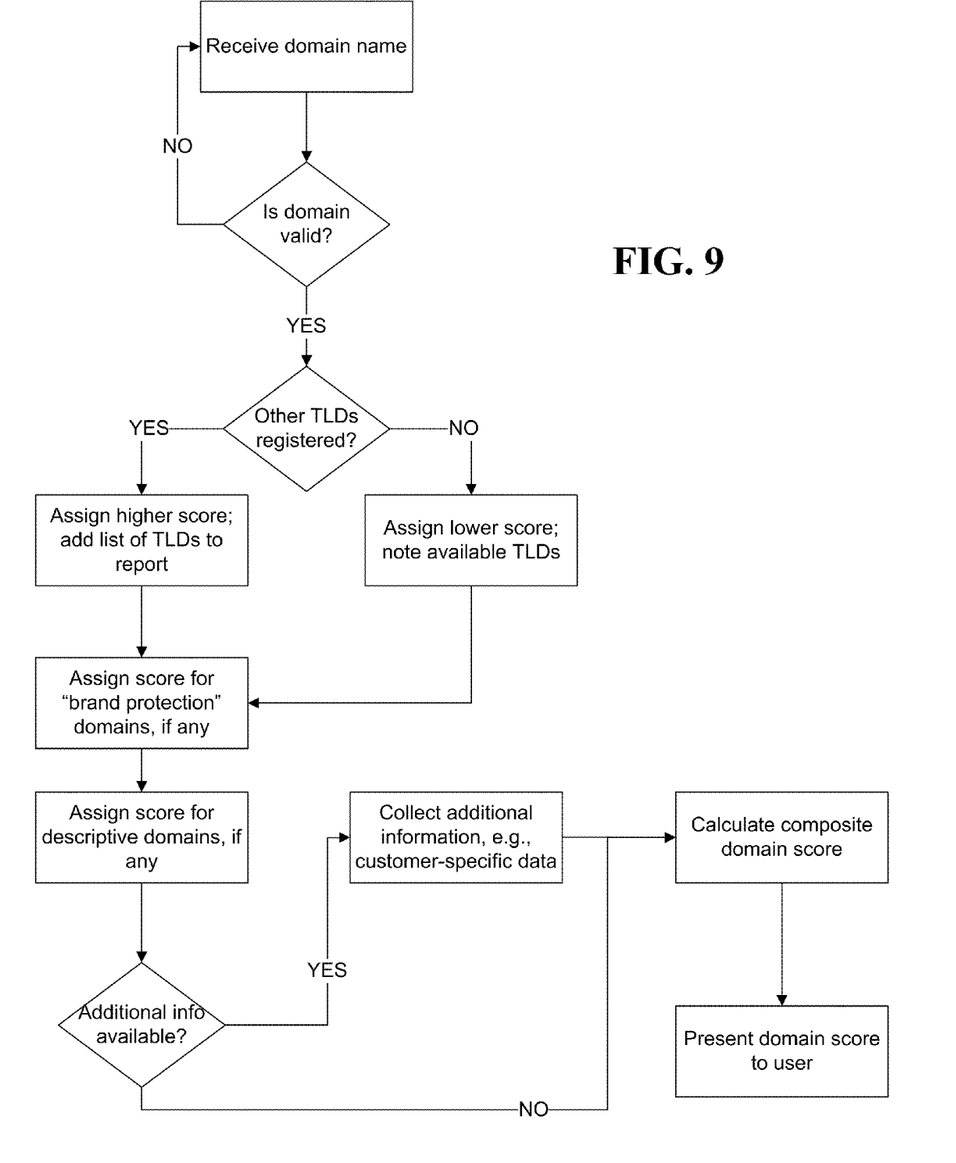
FIG. 9 shows an example process for calculating a domain score.

FIG. 9 shows an example process for calculating a domain score.

Figure 10:
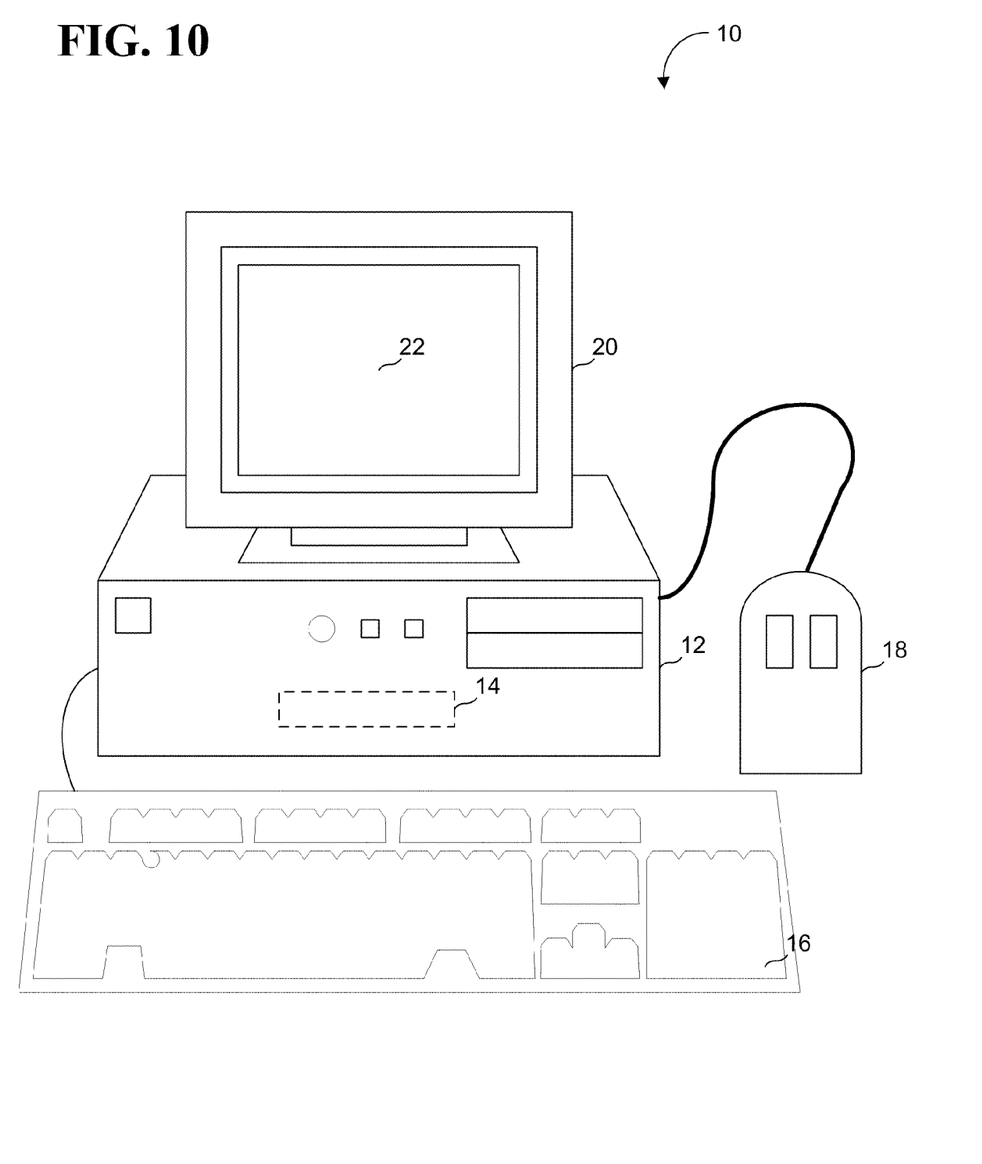
FIG. 10 shows an example computer.

The methods, systems, and machines described herein may be implemented on one or more general or special purpose computers. FIG. 10 shows an example of a such a computer. The computer 10 may include a processing unit 12, which may include one or more computer readable storage media 14. The computer readable storage media may be physical, tangible devices. The computer may interface with a human operator via an output 20, which may include a visual display 22 to display text, graphics, video, and other visual data. The computer may receive input via a mouse 18 and/or a keyboard 16. The general operation of the computer 10 will be understood to one of skill in the art.

Figure 11:
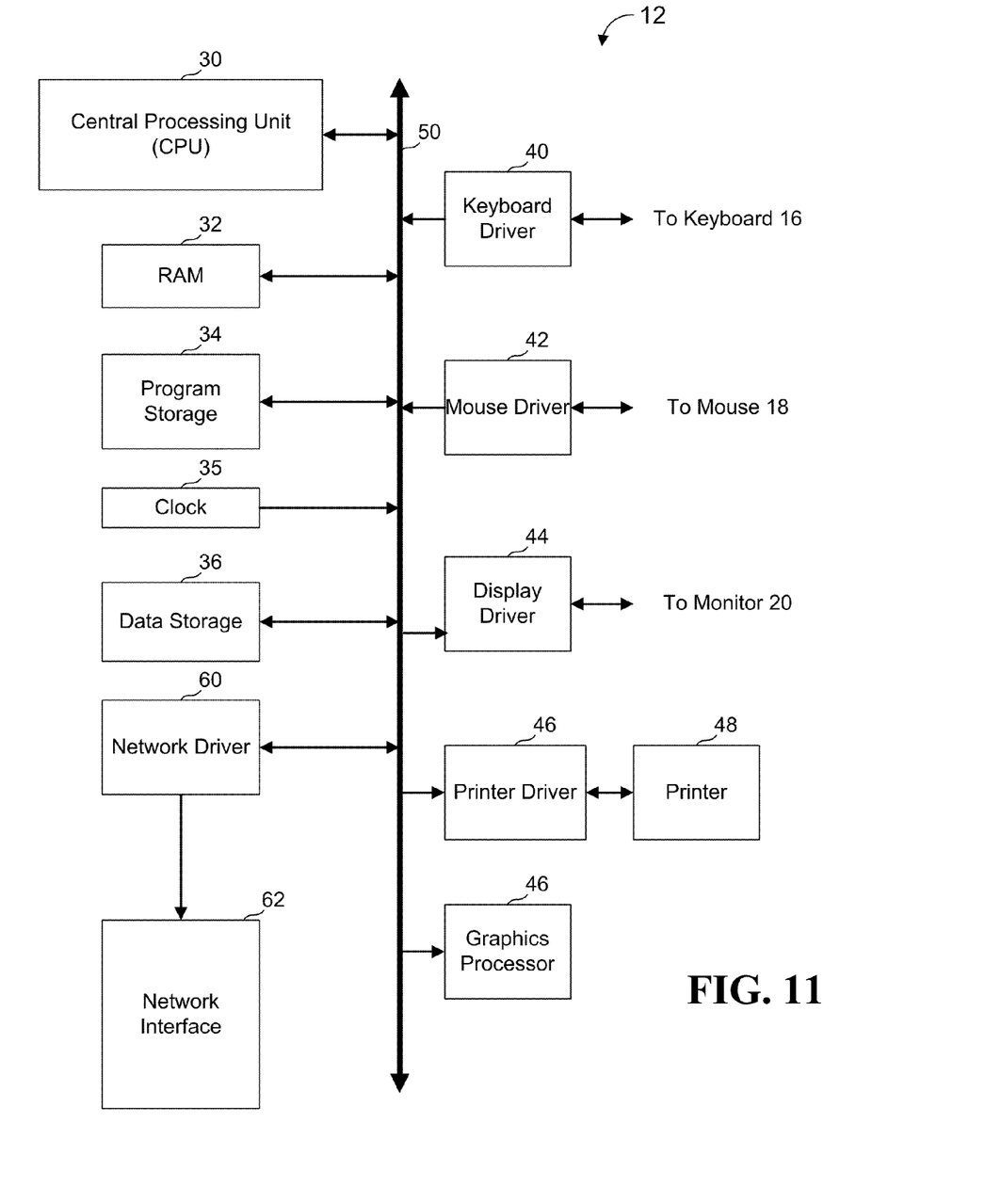
FIG. 11 shows a schematic diagram of a processing unit of a computer as shown in FIG. 10.

FIG. 11 shows a schematic diagram of the processing unit 12. A central processing unit 30 may communicate with various other components via a main bus 50 and other suitable communication lines (not shown). Data may be stored in volatile memory such as RAM 32, program storage 34 and/or data storage 36. The program storage 34 and/or data storage 36 may include various types of computer-readable media, such as CD-ROMs or other type of optical disks, floppy diskettes, ROMs, RAMs, EPROMs, EEPROMs, magnetic or optical cards and drives, flash memory, or other types of machine-readable media suitable for storing electronic instructions, which may be physical, tangible devices. Computer-readable instructions may be stored in the program storage 34. When executed by the computer, these instructions may cause the computer to implement specific methods as described herein, and may cause the computer to operate in accordance with those methods. Execution of the instructions stored in the program storage 34 may transform a general-purpose computer into a computer configured to perform one or more methods embodied by the instructions. A clock 35 may be used to synchronize operation of the other elements of processing unit 12. A network driver 60 may manage connections between a network interface 62, such as a TCP/IP or other suitable interface, to allow the computer to communicate with other computers, operators, or other entities. A keyboard driver 40 may communicate with the keyboard 16 to receive input from an operator. A mouse driver 42 may manage communication with the mouse 18 to coordinate reception of input signals. A display driver 44 may manage communications between the processing unit 12 and the monitor 20, such as to display appropriate output on the monitor 20. Similarly, a printer driver 46 may manage communications with a printer 48. A graphics processor 46 may generate and manage manipulation and display of graphical elements such as 2D images, 3D images and objects, and other visual elements. The general operation of the various components shown in FIG. 6 otherwise will be understood by one of skill in the art.

Figure 12:
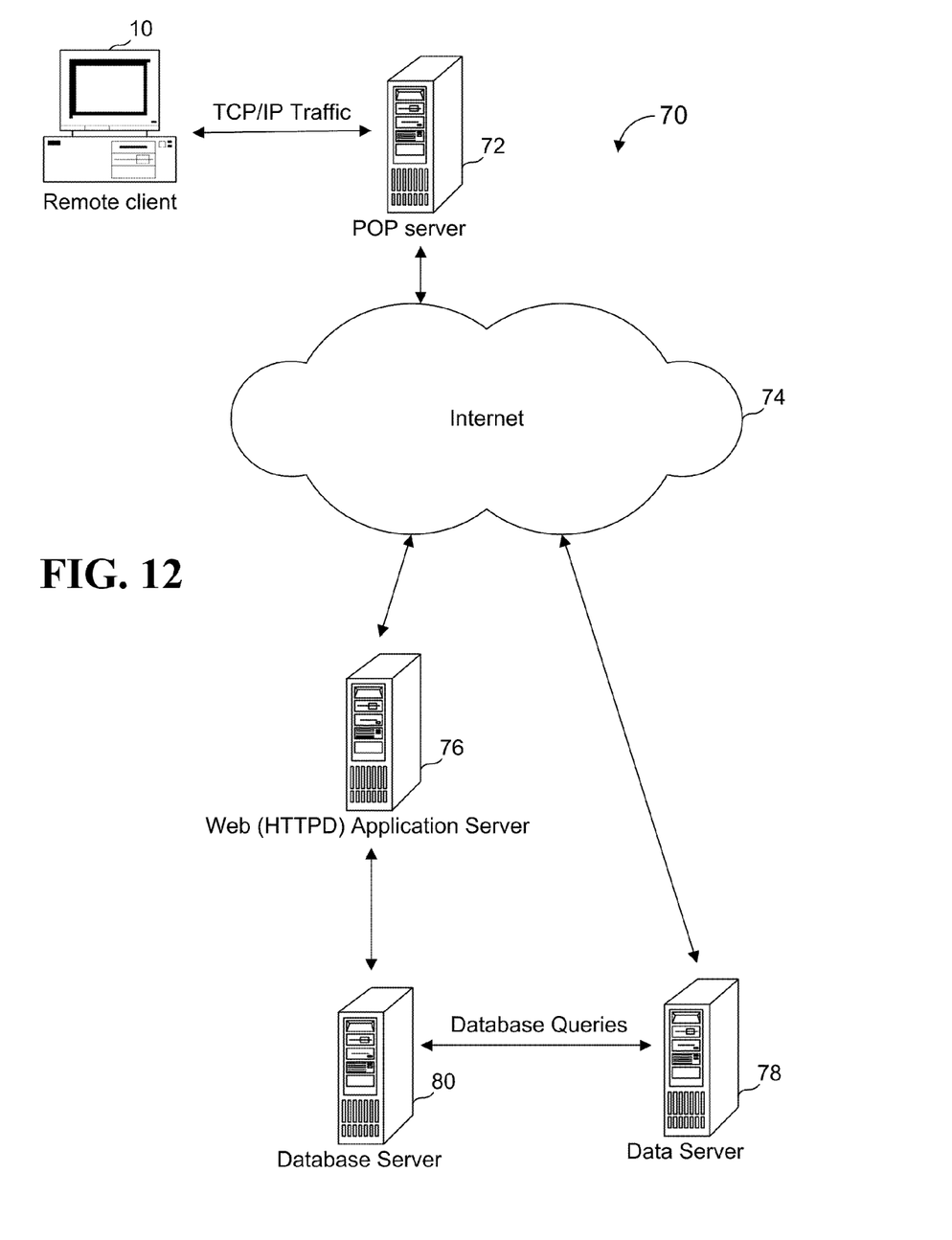
FIG. 12 shows a system for connecting multiple computers.

FIG. 12 shows a system 70 including a computer 10 which may function as a remote unit, and connect to the Internet 74 or another network via a point-of-presence (POP) server 72 or directly. The computer 10 may connect to the internet, another network, and/or the POP server via the network interface 62 shown in FIG. 10. The computer 10 may communicate via the network 74 with a web server 76 or other application server, such as to allow for regression testing an application executed by the server 76, to access a testing tool executed by the server 76, or to perform other functions. The application server 76 may communicate with a database server 80, data server 78, or other servers and computers as will be understood by one of skill in the art.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method for calculating a value score for a domain name, the method comprising:
at a computer, receiving a domain name to be scored;
determining, by a processor of the computer, a number of equivalent top-level domain names corresponding to the received domain name that are registered in the domain name system;
assigning a first sub-score based on the number of equivalent top-level domain names registered;
determining, by the processor of the computer, a number of related domain names that are registered in the domain name system;
assigning a second sub-score based on the number related domain names registered in the domain name system;
automatically collecting registration data for the received domain name;
assigning a third sub-score based on the automatically-collected registration data;

generating, by the processor of the computer, a domain name score for the received domain name, the domain name score being determined from the first, second, and third subscores;

identifying a technique for increasing at least one of the first, second, and third subscores; and providing the domain name score and the identified technique to a user.

2. The method of claim 1, wherein the registration data comprises data retrieved by a whois query.

3. The method of claim 2, wherein the registration data comprises at least one of the registration term of the domain name, whether the domain name registration includes a privacy feature, and whether a transfer lock is enabled for the domain name.

4. The method of claim 1, wherein the method is implemented by a domain name registrar, the method further comprising:

determining that the user is a customer of the domain name registrar and has registered the domain name with the domain name registrar; and automatically collecting customer data associated with the user;

wherein at least one of the first, second, and third sub-scores is assigned further based at least in part on the collected customer data.

5. The method of claim 1, further comprising:

suggesting at least one additional domain name for registration by the user;

receiving a request from the user to register the at least one additional domain name; and registering the at least one additional domain name.

6. A computer-implemented method for calculating a value score for a domain name, the method comprising:

at a computer, receiving a domain name to be scored;

measuring, by a processor of the computer, a plurality of domain name registration criteria for the received domain name;

for each of the plurality of domain name registration criteria, assigning a sub-score to the domain name;

calculating a combined domain name score based on the sub-scores;

identifying a technique for increasing the combined domain name score;

and providing the domain name and the identified technique to the user.

7. The method of claim 6, wherein the domain name registration criteria include the number of equivalent top-level domain names corresponding to the received domain name that are registered in the domain name system.

8. The method of claim 6, wherein the domain name registration criteria include the number of related domain names are registered in the domain name system.

9. The method of claim 6, wherein the domain name registration criteria include registration data available via a who is lookup of the domain name.

10. The method of claim 6, further comprising identifying a technique for increasing at least one of the first, second, and third sub-scores.

11. A non-transitory computer-readable storage medium storing a plurality of instructions which, when executed by a processor, cause the processor to perform a method comprising:

determining a number of equivalent top-level domain names corresponding to the received domain name that are registered in the domain name system;

assigning a first sub-score based on the number of equivalent top-level domain names registered;

determining a number of related domain names that are registered in the domain name system;

assigning a second sub-score based on the number related domain names registered in the domain name system;

automatically collecting registration data for the received domain name;

assigning a third sub-score based on the automatically-collected registration data;

generating a domain name score for the received domain name, the domain name score being determined from the first, second, and third sub-scores;

identifying a technique for increasing at least one of the first, second, and third subscores;

and providing the domain name score and the identified technique to the user.

12. The computer readable storage medium of claim 11, wherein the registration data comprises data retrieved by a whois query.

13. The computer readable storage medium of claim 12, wherein the registration data comprises at least one of the registration term of the domain name, whether the domain name registration includes a privacy feature, and whether a transfer lock is enabled for the domain name.

14. The computer readable storage medium of claim 13, said method further comprising:

determining that the user is a customer of a domain name registrar and has registered the domain name with the domain name registrar; and automatically collecting customer data associated with the user;

wherein at least one of the first, second, and third sub-scores is assigned further based at least in part on the collected customer data.

15. The computer readable storage medium of claim 11, said method further comprising:

suggesting at least one additional domain name for registration by the user;

receiving a request from the user to register the at least one additional domain name; and registering the at least one additional domain name.

16. The method of claim 10, further comprising providing the technique to the user.

17. The method of claim 6, further comprising suggesting at least one additional domain name for registration by the user;

receiving a request from the user to register the at least one additional domain name; and registering the at least one additional domain name.

18. The method of claim 17, wherein the suggested at least one additional domain name has a higher domain name score than the domain name score generated for the received domain name.

19. The computer readable storage medium of claim 11, wherein the suggested at least one additional domain name has a higher domain name score than the domain name score generated for the received domain name.

* * * * *